US012561785B2

(12) United States Patent
Miller et al.

(10) Patent No.: US 12,561,785 B2
(45) Date of Patent: Feb. 24, 2026

(54) SYSTEM AND METHOD FOR INSPECTION OF A WIND TURBINE BLADE SHELL PART

(71) Applicant: LM WIND POWER, Kolding (DK)

(72) Inventors: Gary Miller, Kolding (DK); Abhay Laxmanrao Waghmare, Bengaluru (IN); Ravichandra Bangalore Hutchaiah, Bengaluru (IN); Arpit Jain, Schenectady, NY (US); Vinayakumar Savadattimath, Bengaluru (IN)

(73) Assignee: LM WIND POWER A/S, Kolding (DK)

( * ) Notice: Subject to any disclaimer, the term of this patent is extended or adjusted under 35 U.S.C. 154(b) by 298 days.

(21) Appl. No.: 18/272,177

(22) PCT Filed: Feb. 8, 2022

(86) PCT No.: PCT/EP2022/053007
§ 371 (c)(1),
(2) Date: Jul. 13, 2023

(87) PCT Pub. No.: WO2022/171624
PCT Pub. Date: Aug. 18, 2022

(65) Prior Publication Data
US 2024/0078654 A1 Mar. 7, 2024

(30) Foreign Application Priority Data
Feb. 9, 2021 (EP) ..................................... 21156082

(51) Int. Cl.
*G06T 7/00* (2017.01)
*G01N 21/95* (2006.01)
(Continued)

(52) U.S. Cl.
CPC ........... *G06T 7/0004* (2013.01); *G01N 21/95* (2013.01); *G06T 5/20* (2013.01); *G06V 10/764* (2022.01);
(Continued)

(58) Field of Classification Search
CPC ..................... G06T 7/0004; G06T 5/20; G06T 2207/10048; G06T 2207/20084;
(Continued)

(56) References Cited

U.S. PATENT DOCUMENTS

2011/0138937 A1 6/2011 Fritz
2014/0033799 A1 2/2014 Newman
(Continued)

FOREIGN PATENT DOCUMENTS

CN 111458339 A * 7/2020 ............. G01N 21/00
EP 2275670 A2 1/2011
(Continued)

*Primary Examiner* — Tom Y Lu
(74) *Attorney, Agent, or Firm* — Nath, Goldberg & Meyer; Jerald L. Meyer

(57) ABSTRACT
A wind turbine blade inspection system for inspecting a wind turbine blade part, such as a wind turbine blade shell part or a wind turbine blade spar cap, for defects, is described. The wind turbine blade shell part extends in a longitudinal direction, and wherein the system comprises: at least a first image capturing device; conveying means for moving the at least first image capturing device along the wind turbine blade part and configured so as to capture a plurality of acquired images comprising first images of parts of the wind turbine blade part along the wind turbine blade part; and an image processing unit configured to identify an anomaly in the plurality of acquired images and identify whether the anomaly relates to a defect in the wind turbine blade part.

22 Claims, 7 Drawing Sheets

(51) Int. Cl.

| | |
|---|---|
| *G06T 5/20* | (2006.01) |
| *G06V 10/764* | (2022.01) |
| *G06V 10/82* | (2022.01) |
| *G06V 20/50* | (2022.01) |
| *H04N 5/262* | (2006.01) |

(52) U.S. Cl.
CPC .............. *G06V 10/82* (2022.01); *G06V 20/50* (2022.01); *H04N 5/2624* (2013.01); *G06T 2207/10048* (2013.01); *G06T 2207/20084* (2013.01); *G06T 2207/20212* (2013.01); *G06T 2207/30164* (2013.01)

(58) Field of Classification Search
CPC . G06T 2207/20212; G06T 2207/30164; G06T 2207/20081; G06T 2207/20221; G06T 2207/10016; G06T 7/001; G01N 21/95; G01N 21/8851; G01N 2021/8472; G01N 21/9515; G06V 10/764; G06V 10/82; G06V 20/50; H04N 5/262; F05B 2230/80; F05B 2260/80; F05B 2270/8041; F03D 80/50; F03D 17/00
See application file for complete search history.

(56) References Cited

U.S. PATENT DOCUMENTS

| | | | |
|---|---|---|---|
| 2018/0273173 A1 | 9/2018 | Moura | |
| 2019/0338759 A1* | 11/2019 | Badger | .................. B29C 73/02 |
| 2020/0166019 A1* | 5/2020 | Lin | ........................... G06T 7/33 |

FOREIGN PATENT DOCUMENTS

| | | | | |
|---|---|---|---|---|
| EP | 2466120 | A2 | 6/2012 | |
| EP | 3339640 | A1 | 6/2018 | |
| EP | 3453874 | A1 | 3/2019 | |
| KR | 20200031860 | A * | 3/2020 | ............. G06N 20/00 |

* cited by examiner

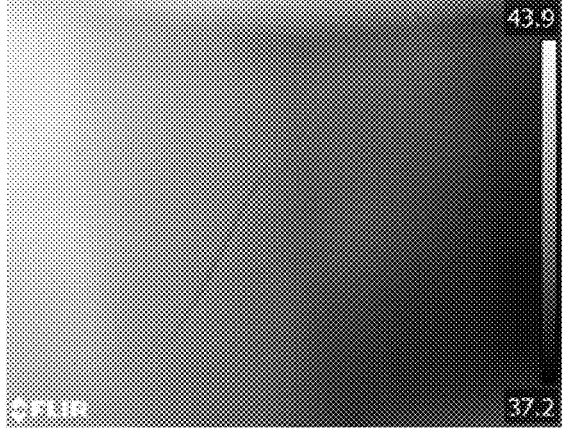
Fig. 5a
Fig. 5b
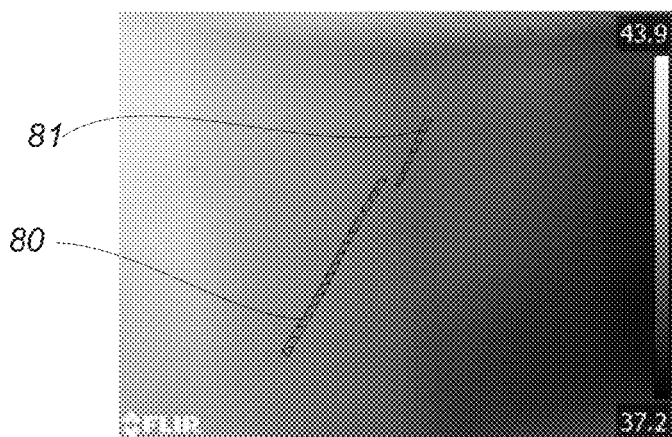
Fig. 5c

SYSTEM AND METHOD FOR INSPECTION OF A WIND TURBINE BLADE SHELL PART

This is a National Phase Application filed under 35 U.S.C. 371 as a national stage of PCT/EP2022/053007, filed Feb. 8, 2022, an application claiming the benefit of European Application No. 21156082.6, filed Feb. 9, 2021, the content of each of which is hereby incorporated by reference in its entirety.

FIELD OF THE INVENTION

The present invention relates to a wind turbine blade inspection system for inspecting a wind turbine blade shell part for defects and a method for inspecting a wind turbine blade shell part for defects.

BACKGROUND OF THE INVENTION

Elongated structures such as wind turbine blades, airplane wings, and vessel hulls can be manufactured in a composite material comprising fibre-reinforcing material embedded in a polymer matrix. The fibre-reinforcing material is often stacked forming a plurality of stacked layers, while aligning an orientation of the fibres with the longitudinal direction of the elongated structure in order to provide stiffness in the longitudinal direction. Alignment of the stacked fibre layers is of paramount importance for the reliability and strength of the elongated structure. Any fibre misalignment can result in a failure or breakage of the wind turbine blade. Therefore, identifying or locating a fibre misalignment or wrinkle (e.g., in-plane or out-of-plane misalignments) is essential to remedy the fibre misalignment and thus to ensure reliability of wind turbine blades. Knowing if there is a fibre misalignment defect in the elongated structure and being able to quantify the defect, with its location, allows to engage into appropriate repair work (such as grinding the fibre misalignment away and replacing the grinded parts) and thus eliminates excessive repair work. Furthermore, fibre misalignment detection provides a higher reliability of the manufactured wind turbine blade, while also providing enhanced safety.

Today, fibre misalignments are detected by inspecting visually on the surface of the elongated structure with a flashlight and are quantified using very simple tools (such as wrinkle comb and ruler) when a misalignment is observed. Such visual inspection is not sufficient since it allows only detecting fibre misalignments that are present on the surface of the elongated structure. Also, such visual inspection may be time-consuming and inefficient with respect to small surface undulations that might be missed during visual inspection. Fibre misalignments that are not on the surface only, such as deeper fibre misalignments or hidden fibre misalignments are equally detrimental to the reliability of the elongated structure.

Ultrasonic testing methods have not proven sufficiently useful as a method to identify and quantify wrinkles. Ultrasonic testing methods require specific material (which may contaminate surfaces of the blades) to be added for detection of misalignment, in order to provide a contact surface between the sensor and the object under testing. Further, the sensors operate at wavelengths that do not enable appropriate detection or quantification of the wrinkles.

It is also well known to scan for other defects after or during pre-consolidation or curing of the structure, e.g., using camera systems. Such defects can for instance relate to areas with air pockets formed in the composite material or in the alternative areas which have a too high resin content. However, such systems require the presence of a human operator to identify the possible defects and also to suggest a proper repair method to remedy the defect. Accordingly, the detection of defects relies on the experience of a human error and is prone to errors.

Accordingly, there is a need for automated processes that more efficiently can identify defects and suggest a proper repair method to remedy the defect and which are less prone to errors.

SUMMARY OF THE INVENTION

It is an object to obtain a system and method, which overcome or ameliorate at least one of the disadvantages of the prior art or which provide a useful alternative.

According to a first aspect, this is obtained by a wind turbine blade inspection system for inspecting a wind turbine blade part, such as a wind turbine blade shell part or a wind turbine blade spar cap, for defects, wherein the wind turbine blade part extends in a longitudinal direction, and wherein the system comprises: at least a first image capturing device; conveying means for moving the at least first image capturing device along the wind turbine blade part and configured so as to capture a plurality of acquired images comprising first images of parts of the wind turbine blade part along the wind turbine blade part; and an image processing unit configured to identify an anomaly in the plurality of acquired images and identify whether the anomaly relates to a defect in the wind turbine blade part.

According to a second aspect, the objective is obtained by a method for inspecting a wind turbine blade part, such as a wind turbine blade shell part or a wind turbine blade spar cap, for defects, wherein the wind turbine blade part extends in a longitudinal direction, and wherein the method comprises the steps of:

> conveying at least a first image capturing device along the wind turbine blade part;
> capturing a plurality of acquired images comprising first images of parts of the wind turbine blade part along the wind turbine blade part using the at least first image capturing device;
> image processing the plurality of acquired images to identify whether any of the plurality of acquired images includes an anomaly; and
> in accordance with identifying an anomaly, determining whether the anomaly relates to a defect in the wind turbine blade part.

Thus, the system and method are configured to convey the first image capturing device along the wind turbine blade and detect anomalies that may relate to defects in the wind turbine blade part. Thus, it is also clear that the described solution is used for identifying defects in a composite structure comprising reinforcement fibres, such as glass and/or carbon fibres, in a polymer matrix, e.g., a cured resin.

An anomaly is defined as observations in the plurality of acquired images that deviates from the majority of the data from the plurality of acquired images or that deviates from an expected image. For optical images, it may for instance be an unexpected variation or undulations in the surface of the wind turbine blade, and for thermal or infrared images it may for instance be unexpected variations in the thermal image, such as local variations in the thermal image. A variation in surface height may for instance be indicative of wrinkles in the fibre layup. Further, a lack of (expected) thermal radiation may be indicative of a lack of resin and a possible air pocket, whereas an increase in (expected) thermal radiation may be indicative of a resin rich area. However, this may also be combined with the foreknowledge of the constructional design of the wind turbine blade part, e.g., knowledge about position of spar caps, sandwich constructions, and the like. In practice, and as later explained in detail, the system and method may be configured to identify the anomaly via image annotations. The system is preferably pretrained to identify the anomalies and provide the image annotations. In such a system, the image may be annotated with labels that for instance represent a particular defect type.

It is clear that the defects can relate to surface defects or to subsurface defects within the wind turbine blade part.

In the following, preferred embodiments according to the above aspects are described. The various embodiments may be combined in any conceived combination. The embodiments refer to a wind turbine blade part. The part is preferably a wind turbine blade shell part or a spar cap for a wind turbine blade. It is noted that the spar cap may be manufactured separately and be connected, e.g., by adhesion, to an aerodynamic shell. Thus, both the aerodynamic shell and spar cap may be inspected separately. However, it is also possible to manufacture a wind turbine blade shell part, e.g., a pressure side shell or suction side shell, with the spar cap integrated into the wind turbine blade shell part. In such an embodiment, the aerodynamic shell and the spar cap may be inspected simultaneously.

According to the claimed invention, the system and method preferably relates to the inspection during the manufacture of a wind turbine blade. Accordingly, the system is preferably configured to inspecting the wind turbine blade part, such as a wind turbine blade shell or a spar cap, during the manufacture of the blade. Thus, the system is configured to be used at the manufacturing facilities. Similarly, the inspection method is preferably used during the manufacturing of a wind turbine blade, e.g. after curing of a wind turbine blade shell or a spar cap.

Further, according to the claimed invention, the system and method preferably utilises both first image capturing device in form of a thermographic image capturing device or an infrared camera as well as a second image capturing device in form of an optical camera.

In an advantageous embodiment, the first image capturing device is a thermographic image capturing device or an infrared camera. The thermographic image capturing device or infrared camera may for instance capture images while or immediately after the wind turbine blade part is hardening or cured and where the resin may still emit exothermic heat from the curing process. The thermographic image capturing device, or an infrared camera, may continuously capture images to a video feed, or it may be configured to acquire still images at, e.g., predefined positions or with a predefined spacing.

In another advantageous embodiment, the first image capturing device is an optical camera. The optical camera may capture images of in particular the surface of the wind turbine blade part and may capture inter alia variations in colour or surface height that may indicate an anomaly and a possible defect. For surface height detection, it is for instance possible to use two optical cameras to render a three-dimensional image of the surface height. However, it is also possible via other techniques. The optical camera may continuously capture images to a video feed, or it may be configured to acquire still images at, e.g., predefined positions or with a predefined spacing.

In a preferred embodiment, the system comprises the first image capturing device and a second image capturing device and wherein the system is configured so as to capture a plurality of second images of parts of the wind turbine blade part along the wind turbine blade part. The acquired images thus comprise both the first images acquired from the first image capturing device and second images acquired from the second image capturing device.

Preferably, the first image capturing device is a thermographic image capturing device or an infrared camera, and the second image capturing device is an optical camera. The acquired images thus comprise both thermographic images and optical images that together can be utilised to detect anomalies.

In another preferred embodiment, the at least first image capturing device is configured and positioned to capture images depicting an entire width of the wind turbine blade part. Thus, the conveying system only needs to move the first image capturing device in the longitudinal direction of the wind turbine blade part in order to acquire images of the entire surface of the wind turbine blade part.

In yet another preferred embodiment, the system further comprises a position logging unit that is configured to log the positions of the plurality of acquired images. The position of the acquired images may for instance be determined by determining the position of the at least first image capturing device and thereby mapping the acquired image according to the position of the at least first image capturing device. The system may for instance comprise a stitching module that is configured to stitch the plurality of acquired images or plurality of image processed images to a stitched image mapping a full view of the wind turbine blade part. Thus, the system is configured to provide a full image of the wind turbine blade part, which provides a better feedback as to the positions of the possible anomalies and defect.

In one embodiment, the system comprises a filter module that is configured to filter our images chosen from the group of: images that are blurred and/or images that do not contain images of the wind turbine blade part and/or images that overlap more than a predefined overlap threshold value. The filter module may for instance use statistical image processing and/or machine learning to identify blurred images.

The purpose of the filter module is to reduce the data required for inspection purpose. To filter out frames, a deep neural network may be leveraged to identify whether an image is blurred or contains objects of interest or not. Such a network can be trained via artificially created blurred data using different blur filters to identify blurred images. Similarly, the network can be trained using images of a blade part as well as non-blade part structures to automatically filter out images that are not blade part images. As an example, MobileNet Network can be used to train a classifier for the given task. However, any classification network can be used to achieve the same goal. One can also use statistical measures to estimate blur without the use of a machine learning approach.

According to particularly advantageous embodiments, the overlap of images is determined using at least one of: cross correlation of two images, squared difference of two images, or metric learning, e.g., using a Siamese network (sometimes called a twin neural network that works in tandem on different input vectors) or sparse feature matching.

The overlap threshold value may for instance be between 10% and 50%. The value is set as the ratio of overlapping pixels and the total pixels of an image. The overlap threshold value may for instance be 50%, 40%, 30%, or 20%. This means that the filter module only uses images or frames, where the overlap is smaller than the overlap threshold value.

In a preferred embodiment, the system is configured to identify the anomaly via image annotations. Thus, the images and or full image of the blade part may be annotated via image annotations techniques.

In another preferred embodiment, the system comprises an analytics module that is configured to determine whether the anomaly is related to a particular defect type from a plurality of possible defect types. The plurality of possible defect types may for instance be stored in a database over possible defect types. The database may continuously be updated with new defect types. This can be done manually by a human controller as they are identified, or it may for instance be updated automatically by use of for instance machine learning. Further, the module may be trained using machine learning or artificial intelligence to identify the anomaly and the related defect type. This may preferably be done in accordance with the aforementioned image annotation.

In yet another preferred embodiment, the analytics module is configured to calculate a confidence value for each of the plurality of possible defect types, the confidence value indicating the probability that the anomaly is related to a particular defect type of the plurality of possible defect types. Thus, the analytics module is configured to calculate the probability that the anomaly is associated with a particular defect type. The probability may for instance be calculated by storing characteristics of defect types in a database and compare the characteristics of the identified anomaly with these characteristics.

In an advantageous embodiment, the analytics module is configured to initiate a disambiguation process, if the confidence values of the two defect types with the highest confidence values of the plurality of possible defect types are within a disambiguation threshold value. The disambiguation process may for instance be presented on a display to a controller or user of the system for the controller to decide which type of defect is more likely. If the confidence values for two defect types are close to each other, i.e., within a defined disambiguation threshold value, the process may be started. The disambiguation process may for instance be used to avoid an anomaly to be detected as the incorrect of two approximately equally likely defect types.

In a preferred embodiment, the analytics module is configured to receive the plurality of acquired images and output a mask that identifies which pixels of the plurality of acquired images that belong to a defect and preferably the corresponding defect type. The mask provides an easy overview to locate the regions on the wind turbine blade part having defects. The mask may further form the aforementioned annotation image. The analytics module may preferably be configured to group adjacent pixels that have been identified as belonging to a defect and the same defect type to a single defect region. A defect region may be a cluster of pixels connected to one another in image space which belong to the same defect category. Polygons may be fit to these regions using either connected components or convex hull fitting. The original image data, region boundaries (polygons) and their corresponding defect category for each image along with the meta information related to inspection may then be passed to the visualization module for the inspector to verify, validate and take repair action.

In yet another preferred embodiment, the system further comprises a pointer unit, which is configured to illuminate one or more areas on the wind turbine blade part to identify defect locations for repair work on the wind turbine blade part. This will aid workers in locating and preparing workers to repair the defects. The areas may also be illuminated with particular characteristics to identify the defect type, e.g., by assigning colours to different defect types or simply having the pointer unit write out the defect type. The pointer unit may for instance be a scanning system that outlines the defect and possibly writes the defect type. The system may also be configured to propose an appropriate repair method to remedy the defect. The pointer unit comprises a laser point unit to illuminate the areas on the wind turbine blade part. This provides a simple solution for providing a pointer system to illuminate the areas with a defect. In another preferred embodiment, the pointer unit comprises a plurality of individual laser pointer units or other illumination sources arranged along a longitudinal direction of a mould for manufacturing the wind turbine blade part. This ensures that different workers can perform repairs or correct defects at different positions of the mould at the same time, while the pointer system unit the areas with the defects. In yet another preferred embodiment, the pointer unit comprises one, two or more primary laser pointer units distributed along a first side of a mould for manufacturing the wind turbine blade part, and one, two or more secondary laser pointer units distributed along a second side of the mould for manufacturing the wind turbine blade part. Thereby, it is ensured that the one or more primary laser pointer units can illuminate vertical or near vertical sections of the blade parts at the second side of the mould, and that the one or more secondary laser pointer units can illuminate vertical or near vertical sections of the blade parts at the first side of the mould.

In one embodiment, the method further comprises conveying at least a second image capturing device along the wind turbine blade part; and capturing the plurality of acquired images comprises capturing second images of parts of the wind turbine along the wind turbine blade part using the second image capturing device. Accordingly, two types of images can be acquired to image the wind turbine blade and used to identify an anomaly. In a preferred embodiment, the first images are thermal or infrared images, and the second images are optical images.

In another embodiment, the method comprises the step of logging a position of each of the acquired images. Thereby, the position of each image can be logged and used to provide a larger image of the entire wind turbine blade shell. Alternatively, or in addition thereto, the method may comprise the step of stitching the plurality of acquired images or the plurality of image processed images to a stitched image mapping a full view of the wind turbine blade part. This provides a simple method of providing a full image of the wind turbine blade part, which provides a better feedback as to the positions of the possible anomalies and defects.

In a preferred embodiment, the method comprises the step of calculating a confidence value for the anomaly for each of a plurality of possible defect types, the confidence value indicating the probability that the anomaly is related to a particular defect type of the plurality of possible defect types. Thus, the method is configured to calculate the probability that the anomaly is associated with a particular defect type. The probability may for instance be calculated by storing characteristics of defect types in a database and compare the characteristics of the identified anomaly with these characteristics. Preferably, the method further comprises assigning the particular defect type with the highest confidence value to the anomaly.

In an advantageous embodiment, the method further comprises, in accordance with the confidence values of the two defect types with the highest confidence values of the plurality of possible defect types being within a disambiguation threshold value, initiating a disambiguation process to determine the defect type. The disambiguation may for instance be presented on a display to a controller or user of the system for the controller to decide which type of defect is more likely. The disambiguation process may for instance be used to avoid an anomaly to be detected as the incorrect of two approximately equally likely defect types.

In another preferred embodiment, the method comprises the step of grouping adjacent pixels that have been identified as belonging to a defect and to the same defect type to a single defect region.

In yet another preferred embodiment, the method comprises the step of generating a mask that identifies which pixels of the plurality of acquired images that belong to a defect and preferably the corresponding defect type. The mask provides an easy overview to locate the regions on the wind turbine blade part having defects. The mask may further be used to generate the aforementioned annotation image.

In another preferred embodiment, the method comprises the step of illuminating one or more areas on the wind turbine blade part to identify defect locations for repair work on the wind turbine blade part.

BRIEF DESCRIPTION OF THE FIGURES

The invention is explained in detail below with reference to embodiments shown in the drawings, in which FIGS. 5a-5c illustrate a pre-processed images and a post processed image, respectively, FIG. 6 illustrate the steps of processing frames and stitching them together, and FIG. 7 discloses a pointer system for illuminating areas to identify defect locations for repair.

DETAILED DESCRIPTION OF THE INVENTION

In the following, a number of exemplary embodiments are described in order to understand the invention.

Figure 1:
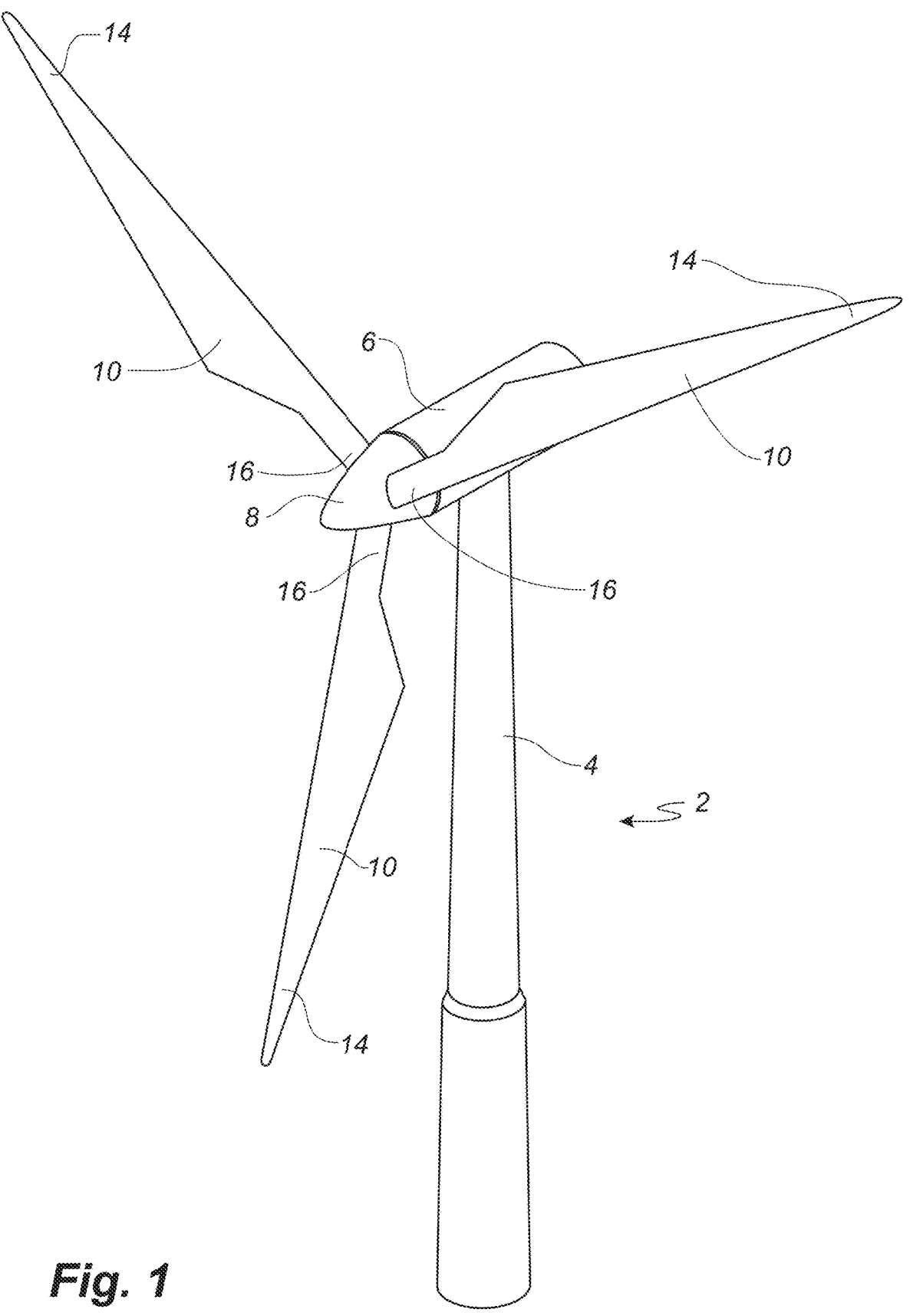
FIG. 1 shows a wind turbine.

FIG. 1 illustrates a conventional modern upwind wind turbine according to the so-called "Danish concept" with a tower 4, a nacelle 6 and a rotor with a substantially horizontal rotor shaft. The rotor includes a hub 8 and three blades 10 extending radially from the hub 8, each having a blade root 16 nearest the hub and a blade tip 14 farthest from the hub 8.

Figure 2:
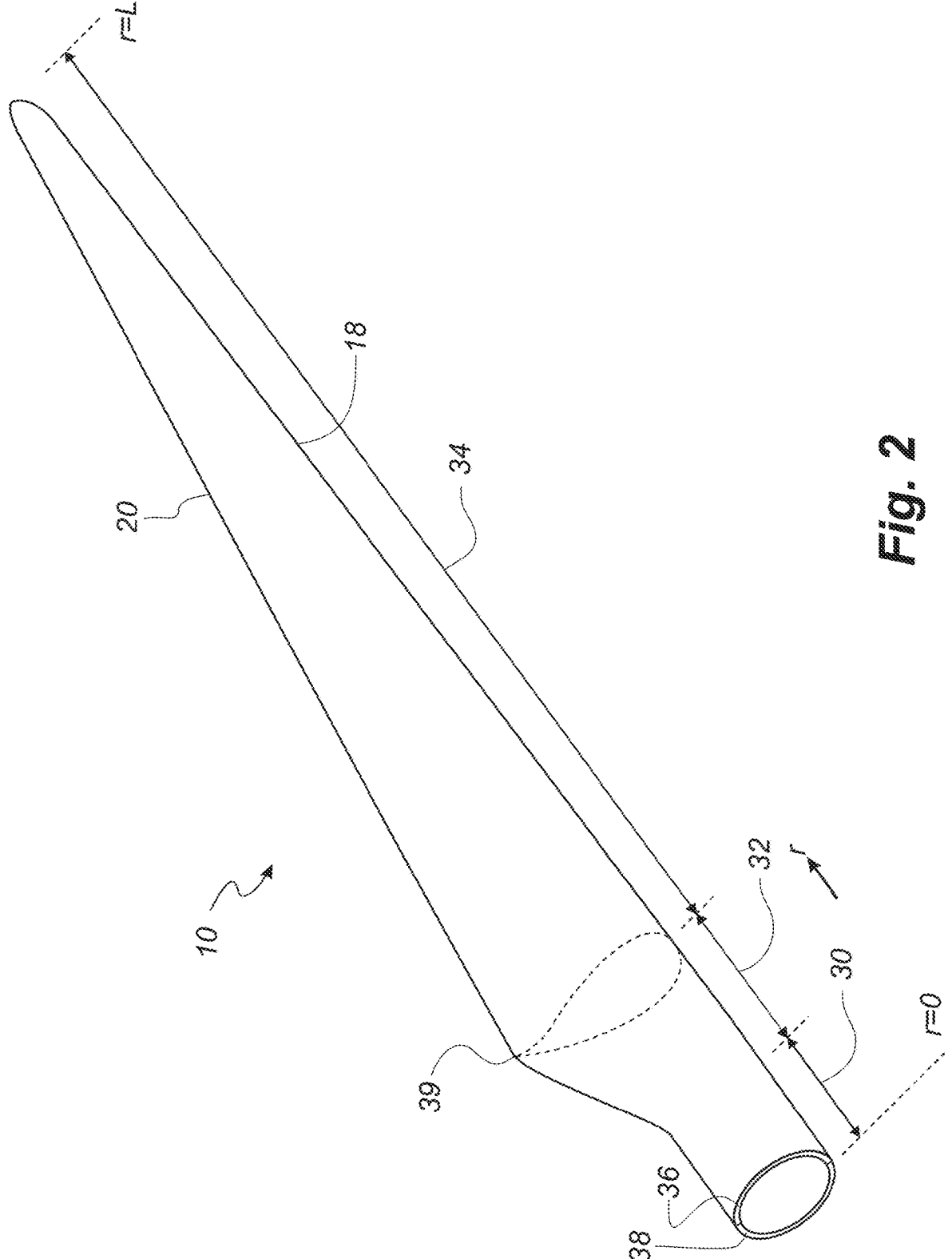
FIG. 2 shows a schematic view of a wind turbine blade.

FIG. 2 shows a schematic view of a first embodiment of a wind turbine blade 10 disclosure. The wind turbine blade 10 has the shape of a conventional wind turbine blade and comprises a root region 30 closest to the hub, a profiled or an airfoil region 34 farthest away from the hub and a transition region 32 between the root region 30 and the airfoil region 34. The blade 10 comprises a leading edge 18 facing the direction of rotation of the blade 10 when the blade is mounted on the hub, and a trailing edge 20 facing the opposite direction of the leading edge 18.

The airfoil region 34 (also called the profiled region) has an ideal or almost ideal blade shape with respect to generating lift, whereas the root region 30 due to structural considerations has a substantially circular or elliptical cross-section, which for instance makes it easier and safer to mount the blade 10 to the hub. The diameter (or the chord) of the root region 30 may be constant along the entire root area 30. The transition region 32 has a transitional profile gradually changing from the circular or elliptical shape of the root region 30 to the airfoil profile of the airfoil region 34. The chord length of the transition region 32 typically increases with increasing distance r from the hub. The airfoil region 34 has an airfoil profile with a chord extending between the leading edge 18 and the trailing edge 20 of the blade 10. The width of the chord decreases with increasing distance r from the hub.

A shoulder 39 of the blade 10 is defined as the position where the blade 10 has its largest chord length. The shoulder 39 is typically provided at the boundary between the transition region 32 and the airfoil region 34.

It should be noted that the chords of different sections of the blade normally do not lie in a common plane, since the blade may be twisted and/or curved (i.e., pre-bent), thus providing the chord plane with a correspondingly twisted and/or curved course, this being most often the case in order to compensate for the local velocity of the blade being dependent on the radius from the hub.

The blade is typically made from a pressure side shell part 36 and a suction side shell part 38 that are glued to each other along bond lines at the leading edge 18 and the trailing edge 20 of the blade.

In the following, the invention is explained with respect to the manufacture of the pressure side shell part 36 or suction side shell part 38.

Figure 3:
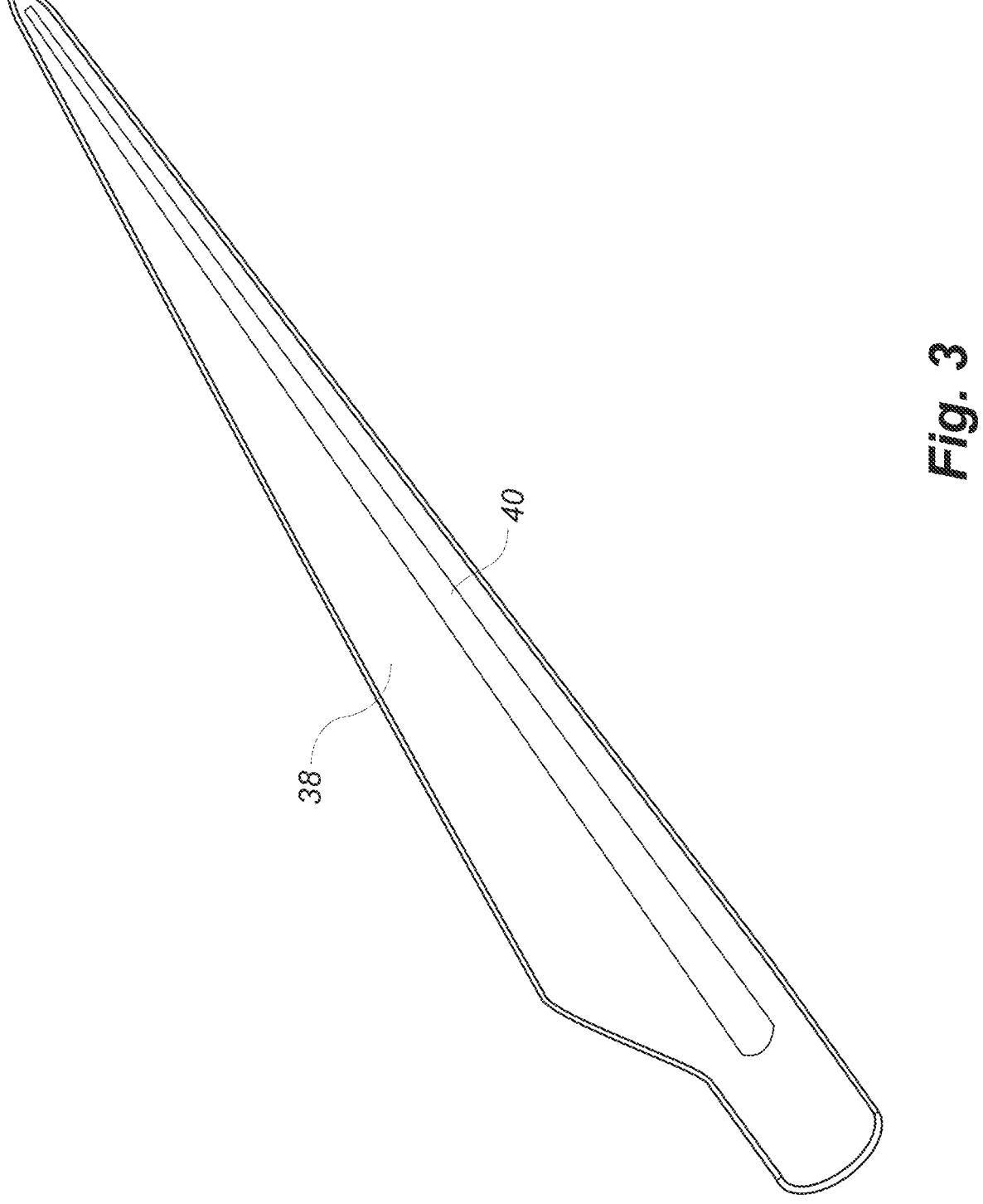
FIG. 3 shows a schematic view of a wind turbine blade shell part.

FIG. 3 shows a perspective view of a blade shell part, here illustrated with the suction side shell part 38, which is provided with a load-carrying structure, which forms a spar cap 40 or main laminate. The spar cap 40 can be integrated into the blade shell part or it can be a separate spar cap that is attached, e.g., by adhesion, to the blade shell part 38. The spar cap 40 may be part of a separate spar structure. However, it is also possible to provide a blade with spar caps provided at both the pressure side shell part 36 and the suction side shell part 38, with one or more shear webs attached between the spar caps.

Figure 4:
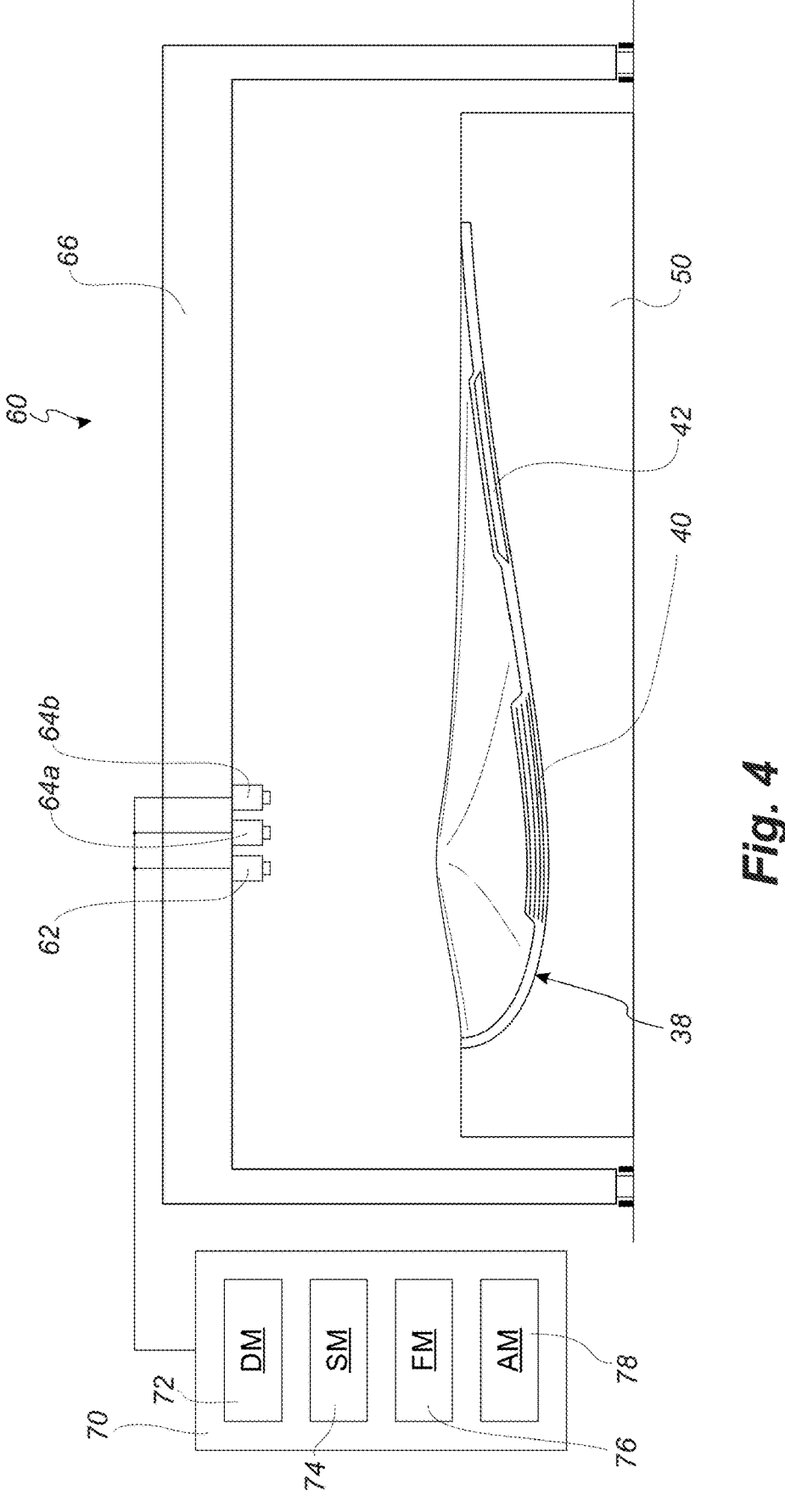
FIG. 4 shows a schematic view of a wind turbine blade inspection system.

FIG. 4 discloses a wind turbine blade inspection system 60 for inspecting a wind turbine blade shell part 38 for defects. The wind turbine blade part 38 is arranged in a mould 50 for forming the wind turbine blade shell 38. In the depicted embodiment, the wind turbine blade shell part 38 is provided with a spar cap 40 and a sandwich construction 42 comprising a sandwich core material, such as balsawood or foamed polymer, in order to stiffen the trailing edge of the wind turbine blade.

The wind turbine blade shell part 38 may additionally comprise additional reinforcing structures (not depicted) at the leading edge and trailing edge of the wind turbine blade shell 38. The wind turbine blade inspection system 60 comprises at least a first image capturing device. In the depicted embodiment, the wind turbine blade inspection system 60 comprises a thermographic image capturing device or infrared camera 62, and a primary optical camera 64a and a secondary optical camera 64b. It may be sufficient to use only a single optical camera. However, the use of two cameras makes it possible to for instance detect the surface topology of the wind turbine blade shell 38. The image capturing devices 62, 64a, 64b are arranged on a conveying means, e.g., in form of a portal or gantry, for moving the image capturing devices 62, 64a, 64b along the wind turbine blade shell part. The conveying means may for instance be arranged on rails along the mould 50.

Accordingly, the wind turbine blade inspection system 60 is configured to capture a plurality of acquired images of parts of the wind turbine blade shell part 38 along the wind turbine blade shell part 38. In the present embodiment, the plurality of acquired images comprises first images captured from the thermographic image capturing device or infrared camera 62, and second images captured from the optical camera(s) 64a, 64b.

The wind turbine blade inspection system 60 further comprises a processing unit or computing unit 70, which is configured to image process captured images from the image capturing devices 62, 64a, 64b. The processing unit 70 is configured to identify an anomaly from the plurality of acquired images and identify whether the anomaly relates to a defect in the wind turbine blade shell part.

In a preferred embodiment, the image capturing devices 62, 64a, 64b are configured and positioned to capture images depicting an entire width of the wind turbine blade shell part. Thus, the conveying system 66 only needs to move the image capturing devices 62, 64a, 64b in the longitudinal direction of the wind turbine blade shell part 38 in order to acquire images of the entire surface of the wind turbine blade shell part 38. In yet another preferred embodiment, the system 60 further comprises a position logging unit that is configured to log the positions of the plurality of acquired images. The position of the acquired images may for instance be determined by determining the position of the at least first image capturing device and thereby mapping the acquired image according to the position of the at least first image capturing device.

The processing unit 70 comprises a data instigation module (DM) 72, a stitching module (SM) 74, a filter module (FM) 76, and an analytics module (AM) 78. The processing unit 70 may be provided as a stand-alone solution provided at the manufacturing site or be part of a server or cloud solution that the images are uploaded to and image processed. Alternatively, some of the modules may be provided locally and others on a server or cloud solution.

The wind turbine blade shell is preferably made as a fibre-reinforced composite structure with reinforcement fibres embedded in a polymer matrix. The polymer matrix may for instance be a polyester, vinylester, or epoxy resin. The thermal radiation may for instance be exothermic radiation from the curing process. The wind turbine blade inspection system 60 may preferably be used immediately after curing of the wind turbine blade shell part 38, where the wind turbine blade shell part is still emitting thermal radiation from the curing process, and where the thermal radiation can be used to identify anomalies in the cured composite structure.

Thus, the system and method are configured to convey the first image capturing device along the wind turbine blade and detect anomalies that may relate to defects in the wind turbine blade shell part. Thus, it is also clear that the described solution is used for identifying defects in a composite structure comprising reinforcement fibres, such as glass and/or carbon fibres, in a polymer matrix, e.g., a cured resin.

An anomaly is defined as observations in the plurality of acquired images that deviates from the majority of the data from the plurality of acquired images or that deviates from an expected image. For optical images, it may for instance be an unexpected variation or undulations in the surface of the wind turbine blade, and for thermal or infrared images it may for instance be unexpected variations in the thermal image, such as local variations in the thermal image. A variation in surface height may for instance be indicative of wrinkles in the fibre layup. Further, a lack of (expected) thermal radiation may be indicative of a lack of resin and a possible air pocket, whereas an increase in (expected) thermal radiation may be indicative of a resin rich area. However, this may also be combined with the foreknowledge of the constructional design of the wind turbine blade shell part, e.g., knowledge about the position of spar caps, sandwich constructions, and the like. In practice, and as later explained in detail, the system and method may be configured to identify the anomaly via image annotations. The system is preferably pretrained to identify the anomalies and provide the image annotations.

The types of anomaly and associated defects may for instance be chosen from the group of: fibre waves or wrinkles in the fibre laminate, dry fibres (lack of resin or presence of air pockets), excess gap between sandwich core elements, delamination, cracks or micro-cracks, stress concentrations, split leading edge or trailing edge (after blade assembly), shear web debonding (after blade assembly), and adhesive bond anomalies. However, the list of possible defects is not limited to the above list, and the system may continuously be updated and configured to identify other types of anomalies and their associated defect type.

The data instigation module 72 consists of an interface to read either infrared images, optical images, infrared video or optical video collected from the image capturing devices 62, 64a, 64b. The data instigation module 72 can either be connected directly to the camera system or connected to a physical or cloud-based data storage to read data. Accordingly, the system 60 may be configured to acquire images from a continuous video feed. However, the system 60 may also be configured to capture images at predefined positions along the wind turbine blade shell part 38.

The system further takes in a video or live feed, or alternatively the images taken from discrete positions, and automatically filters out frames via the filter module 76 that are blurred images or do not contain blade shell images. The purpose of the filter module 76 is to reduce the data required for inspection purpose. To filter out frames, the system may advantageously leverage deep neural network to identify whether an image is blurred or contains objects of interest or not. To train such a network, it is possible to create artificially blurred data using different blur filters and train the network to identify blurred images. Similarly, the network can be trained using images of a blade shell part 38 as well as non-blade shell structures to automatically filter out images that are not blade shell images. MobileNet Network may for instance be used to train a classifier for the given task. However, any classification network can be used to achieve the same goal. It is also possible to use statistical measures to estimate blur without the need for a machine learning approach.

Since the conveying system 66 may move slowly scanning the wind turbine blade part for defects, it is likely that lot of frames may overlap significantly. In order to reduce the overlap, metric learning or statistical measures, such as normalized cross correlation or squared difference, may be utilised to identify if two frames overlap significantly and drop the frames which are non-informative. For metric learning, one can use a Siamese network to identify whether two frames significantly overlap or not. An overlap threshold value may for instance be set to a value between 10% and 50%. The value is set as the ratio of overlapping pixels and the total pixels of an image. The overlap threshold value may for instance be 50%, 40%, 30%, or 20%. This means that the filter module only uses images or frames where the overlap is smaller than the overlap threshold value.

The analytics module 78 may advantageously be a deep neural network, which comprises of multiple layers between input and output. A deep neural network is a machine learning framework, which consists of multiple layers stacked together, and which is trained to mimic the reasoning of the human inspector. In a preferred embodiment, a variant of a deep neural network called Convolution Neural Networks (CNN) may be utilised for processing image data. The input to the network is the images acquired from the image capturing devices 62, 64*a*, 64*b*. The output of the network is a mask that conveys which pixels belong to the defects and their corresponding categories corresponding to image annotations. The network may be trained using the input and output pair provided by an operator in a supervised learning. The operators mark the pixels that belong to defects and their corresponding categories. The network may thus be trained to predict defect pixel locations and the corresponding categories with accuracy. The trained model generates a probability map for each pixel belonging to a defect category. Higher probability indicates a higher chance of a pixel belonging to that defect category. The network can be either directly trained to predict the defect pixel location and its category, or first be trained to predict whether a pixel belongs to a defect or a non-defect category and then classify each defect pixel to its corresponding defect category.

The deep learning system may consist of an encoder-decoder architecture for semantic segmentation task. The encoder network structure learns the appropriate representation required to solve the given task, while the decoder structure combines the low level and high level representations to make prediction. For a directly trained system, the prediction can directly be the probability map of each pixel belonging to a defect category. For a pretrained network, the encode-decoder structure can predict defect and non-defects for each pixel, and those pixels which were recognised as defect can pass through another CNN structure for further classification into defect categories. There are many variants of supervised learning-based neural network architecture designed for semantic segmentation task and any of those architectures can be used for the learning. One of such supervised training algorithms used to demonstrate the invention is residual-UNet, which uses residual block as the building blocks of the neural network architecture.

Based on the probability map, the pixels with high confidence values associated with a defect and/or defect type can be flagged to create a confidence map of the defects in the infrared image. The pixels, which are adjacent to each other, and which belong to the same defect categories can be combined to a single defect region. A region is just a cluster of pixels connected to one another in image space which belong to same defect category. Polygons are fit to these regions using either connected components or convex hull fitting. The original infrared or optical data, region boundaries (polygons) and their corresponding defect category for each image along with the meta information related to inspection is then passed to a visualisation module for an inspector to verify, validate and take repair action.

Accordingly, the system 60 is configured to calculate a confidence value for each of the plurality of possible defect types, the confidence value indicating the probability that the anomaly is related to a particular defect type of the plurality of possible defect types. Thus, the system is configured to calculate the probability that the anomaly is associated with a particular defect type. The probability may for instance be calculated by storing characteristics of defect types in a database and compare the characteristics of the identified anomaly with these characteristics. In an advantageous embodiment, the system 60 is configured to initiate a disambiguation process if the confidence values of the two defect types with the highest confidence values of the plurality of possible defect types are within a disambiguation threshold value. The disambiguation may for instance be presented on a display to a controller or user of the system 60 for the controller to decide which type of defect is more likely. The disambiguation process may for instance be used to avoid an anomaly to be detected as the incorrect of two approximately equally likely defect types.

An example of pre-processed images and a post processed image are shown in FIGS. 5*a*-5*c*. FIG. 5*a* shows as an example an infrared image of a part of blade shell, and FIG. 5*b* shows an optical image of the part of the blade shell as well. From both the infrared image and the optical image, two elongated shapes can be identified, and which correspond to anomalies in the images. Based on the shapes of the anomalies and that the anomalies can be identified in both the infrared image and the optical image is indicative of a wrinkle in form of a fold in the fibre layup. Such a defect can be detrimental to the mechanical strength of the wind turbine blade, in particular if the wrinkle is located in one of the spar caps of the wind turbine blade. FIG. 5*c* shows an annotated image of the infrared image of FIG. 5*a*, where anomalies 80, 81 have been marked. The annotations can for instance be provided with information about the type of defect, e.g. by colour or the type of hatching.

There are several neural network architectures based on auto-encoder and generative adversarial network, which performs learning in an unsupervised setting. The goal there is to learn the normal distribution of the image data, e.g., what do the blades look like without defect and then model the image deviation from normal to flag defects. This technique is especially useful when training data is not available. There is also another paradigm of learning called semi-supervised learning, where a user has limited training data but a lot of unlabelled data. In this learning framework, the additional unlabelled data is used to augment the training with limited training data to learn better representation for the tasks. All these different learning settings can be achieved using deep neural networks by modifying the network architecture, loss function and training procedure.

Figure 6:
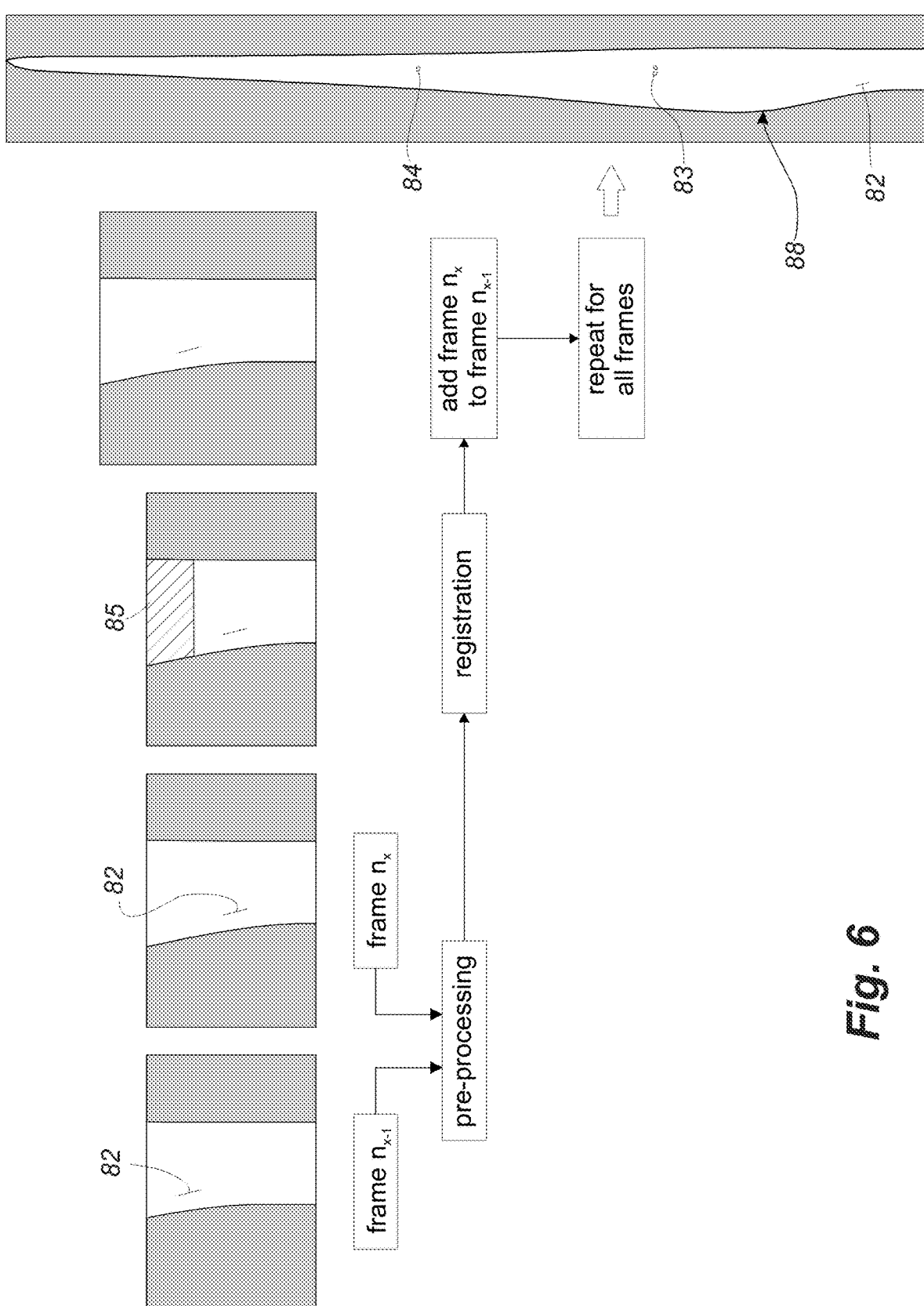

The analytics module 78 may operate directly on the video data, frame by frame, and identify and flag defect in each one of them. The analytics module 78 may also take advantage of temporal consistency and filter out false detection by aggregating prediction over time at a given location. However, due to redundancy in the neighbouring frames (significant overlap between frame "n" and frame "n-1" as shown in FIG. 6), operating anomaly and defect recognition on every frame may not be efficient. In order to reduce the computational burden, the stitching module 74 may be used to select a small set of keyframes from the video data without loss of information. The stitching module 74 may estimate the image quality of each frame together with overlap with the last keyframe. If the overlap is smaller than the aforementioned overlap threshold and meets image quality requirement, then the frame is selected as the new keyframe, and the process continues for the keyframe extraction.

The system 60, after stitching, has the capability of displaying the full wind turbine blade shell part in one image, allowing the operator to understand the location of defects on the blade. This is accomplished by stitching together individual image keyframes (e.g., the thermal/infrared images) using an enhanced correlation-based registration approach. Each frame is registered to the frame before it and then added cumulatively to all frames that were previously registered. Once this process is complete, the entire blade shell part is visible in one stitched image. This process is illustrated in FIG. 6, which shows a first image frame $n_{x-1}$ and a second image frame $n_x$. Both of the frames include an anomaly indicative of a defect. The two images are pre-processed and a non-overlapping image part 85 from frame $n_x$ is identified. Accordingly, it is sufficient to only process the non-overlapping image part 85 of frame $n_x$ to identify anomalies and potential defects, which saves processing power.

Subsequently, the two frames are stitched, and this process is repeated for all frames to achieve a stitched image 88 of the entire wind turbine blade. During pair-wise alignment, errors can accumulate. So as a post processing step, a global alignment approach can be deployed to refine stitched image. A post blending step can be applied to remove gamma correction (or illumination variations). The processed stitched image 88 may include annotations that identify anomalies 82, 83, 84 indicative of defects.

Since the defects are detected on individual frames and the transformation matrix is known between each frame, the defect location on each frame is also known relative to the entire wind turbine blade shell part. The results are overlaid as a layer on the original image, where the category of each polygon is available for the inspector to see, i.e., an annotated image. The operator may select a given defect polygon to see related information such as category, size in pixels, etc. associated with that polygon. The operator also has the ability to remove existing polygons, change predicted category of the polygon or mark a new defect polygon using the tools of the system.

According, the analytics module 78 is configured to determine whether the anomaly is related to a particular defect type from a plurality of possible defect types. The plurality of possible defect types may for instance be stored in a database over possible defect types, e.g., the list of previously mentioned defect types. The database may continuously be updated with new defect types. This can be done manually by a human controller as they are identified, or it may for instance be updated automatically by use of for instance machine learning. Further, the analytics module 78 may be trained using machine learning or artificial intelligence to identify the anomaly and the related defect type.

Figure 7:
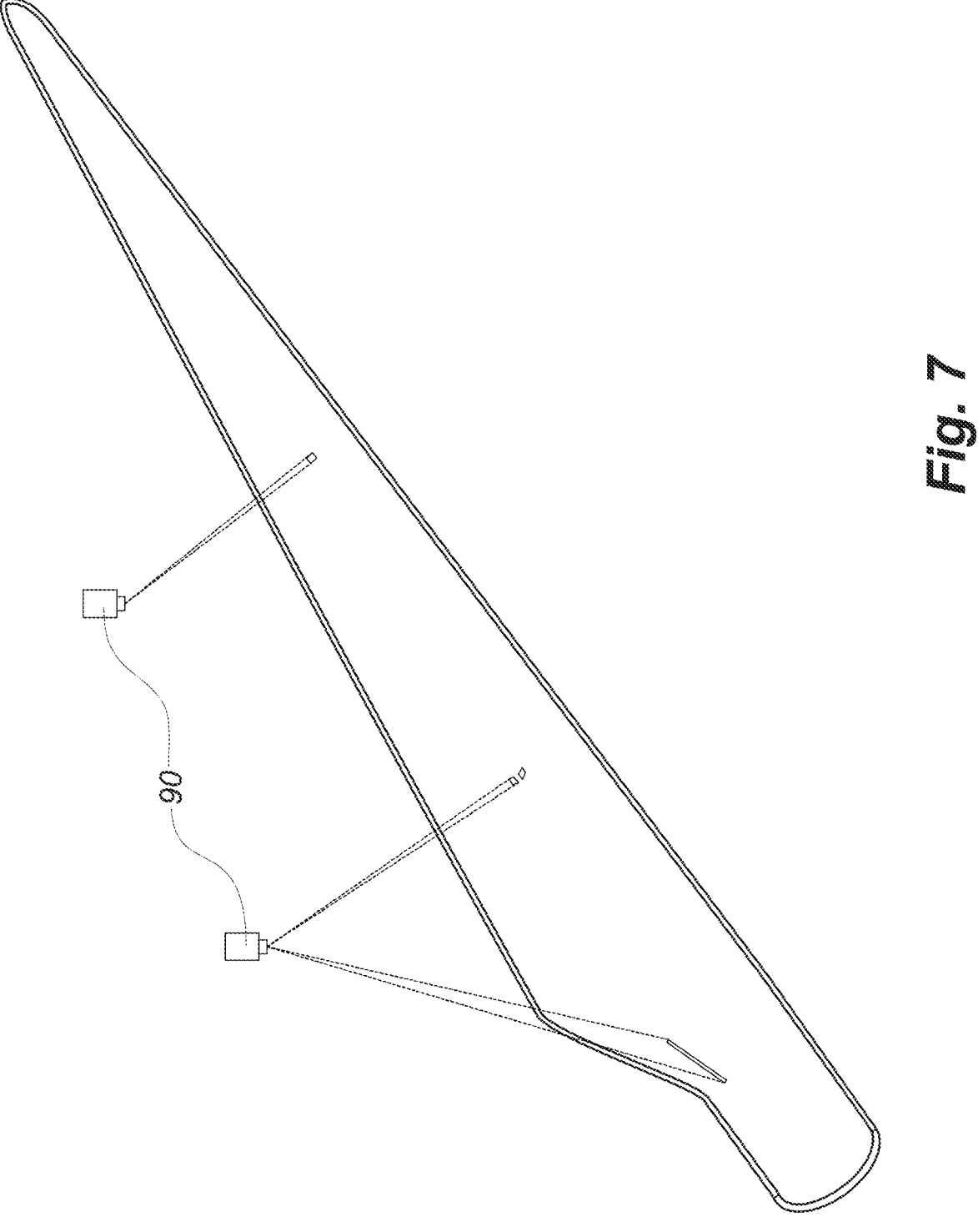

In a final step, a pointer system, such as laser pointers 90, may be used to illuminate areas on the wind turbine blade shell part 38 to identify defect locations for repair as illustrated in FIG. 7. An image capturing device(s) may be calibrated so that the transformation between the coordinate systems of the acquired images and the pointer system is all known. There are several calibration methods that can be used to calibrate the image capturing device(s) and pointer system 90. Once the calibration is done, any point in the image space can be accurately pointed by the pointer system 90 on the wind turbine blade shell. This will enable the inspector to review the results and identify the defect on the blade shell part using the pointer system, thereby reducing the manual process of marking defects. As shown, the pointer system may comprise a plurality of individual laser pointers 90 or other illumination sources arranged along a longitudinal direction of a mould for manufacturing the wind turbine blade part. This ensures that different workers can perform repairs or correct defects at different positions of the mould at the same time, while the pointer system unit the areas with the defects. Alternatively, or in addition hereto, the pointer system may comprise one, two or more primary laser pointer units distributed along a first side of the mould 50, and one, two or more secondary laser pointer units distributed along a second side of the mould 50. Thereby, it is ensured that the one or more primary laser pointer units can illuminate vertical or near vertical sections of the blade shell 38 at the second side of the mould 50, and that the one or more secondary laser pointer units can illuminate vertical or near vertical sections of the blade shell part 38 at the first side of the mould 50. In a preferred embodiment, the pointer system comprises two primary laser pointers 90 at different longitudinal positions along the first side of the mould and two secondary laser pointers 90 at different longitudinal positions along the second side of the mould.

The calibration of the pointer system may be done offline. The training and validation of the defect recognition system may also be done offline.

EXEMPLARY EMBODIMENTS

Exemplary embodiments of the present disclosure are set out in the following items:
1. A wind turbine blade inspection system for inspecting a wind turbine blade part, such as a wind turbine blade shell part or a wind turbine blade spar cap, for defects, wherein the wind turbine blade shell part extends in a longitudinal direction, and wherein the system comprises:
at least a first image capturing device;
conveying means for moving the at least first image capturing device along the wind turbine blade part and configured so as to capture a plurality of acquired images comprising first images of parts of the wind turbine blade part along the wind turbine blade part; and
an image processing unit configured to identify an anomaly in the plurality of acquired images and identify whether the anomaly relates to a defect in the wind turbine blade part.
2. The system according to item 1, wherein the first image capturing device is a thermographic image capturing device or an infrared camera.
3. The system according to item 1, wherein the first image capturing device is an optical camera.
4. The system according to any of items 1-3, wherein the system comprises the first image capturing device and a second image capturing device and wherein the system is configured so as to capture a plurality of second images of parts of the wind turbine blade part along the wind turbine blade part.
5. The system according to item 4, wherein the first image capturing device is a thermographic image capturing device or an infrared camera, and the second image capturing device is an optical camera.
6. The system according to any of items 1-5, wherein the at least first image capturing device is configured and positioned to capture images depicting an entire width of the wind turbine blade part.
7. The system according to any of items 1-6, wherein the system further comprises a position logging unit that is configured to log the positions of the plurality of acquired images.
8. The system according to item 7, wherein the system comprises a stitching module that is configured to stitch the plurality of acquired images or plurality of image processed images to a stitched image mapping a full view of the wind turbine blade part.

9. The system according to any of items 1-8, wherein the system comprises a filter module that is configured to filter our images chosen from the group of: images that are blurred and/or images that do not contain images of the wind turbine blade part and/or images that overlap more than a predefined overlap threshold value.

10. The system according to item 9, wherein the filter module uses statistical image processing and/or machine learning to identify blurred images.

11. The system according to any of items 9-10, wherein the overlap of images is determined using at least one of: cross correlation of two images, squared difference of two images, or metric learning, e.g., using a Siamese network.

12. The system according to any of items 9-11, wherein the overlap threshold value is between 10% and 50%.

13. The system according to any of items 1-12, wherein the system is configured to identify the anomaly via image annotations.

14. The system according to any of items 1-13, wherein the system comprises an analytics module that is configured to determine whether the anomaly is related to a particular defect type from a plurality of possible defect types.

15. The system according to item 14, where the analytics module is configured to calculate a confidence value for each of the plurality of possible defect types, the confidence value indicating the probability that the anomaly is related to a particular defect type of the plurality of possible defect types.

16. The system according to any of items 14-15, wherein the analytics module is configured to initiate a disambiguation process, if the confidence values of the two defect types with the highest confidence values of the plurality of possible defect types are within a disambiguation threshold value.

17. The system according to any of items 14-16, wherein the analytics module is configured to receive the plurality of acquired images and output a mask that identifies which pixels of the plurality of acquired images that belong to a defect and preferably to the corresponding defect type.

18. The system according to item 17, wherein the analytics module is configured to group adjacent pixels that have been identified as belonging to a defect and to the same defect type to a single defect region.

19. The system according to any of items 1-18, wherein the system further comprises a pointer unit, which is configured to illuminate one or more areas on the wind turbine blade part to identify defect locations for repair work on the wind turbine blade part.

20. The system according to item 19, wherein the pointer unit comprises a laser pointer unit to illuminate the areas on the wind turbine blade part.

21. The system according to any of items 19-20, where the pointer unit comprises a plurality of individual laser pointer units or other illumination sources arranged along a longitudinal direction of a mould for manufacturing the wind turbine blade part.

22. The system according to items 19-21, wherein the pointer unit comprises one, two or more primary laser pointer units distributed along a first side of a mould for manufacturing the wind turbine blade part, and one, two or more secondary laser pointer units distributed along a second side of the mould for manufacturing the wind turbine blade part.

23. A method for inspecting a wind turbine blade part, such as a wind turbine blade shell part or a wind turbine blade spar cap, for defects, wherein the wind turbine blade part extends in a longitudinal direction, and wherein the method comprises the steps of:
   conveying at least a first image capturing device along the wind turbine blade part;
   capturing a plurality of acquired images comprising first images of parts of the wind turbine blade part along the wind turbine blade part using the at least first image capturing device;
   image processing the plurality of acquired images to identify whether any of the plurality of acquired images includes an anomaly; and
   in accordance with identifying an anomaly, determining whether the anomaly relates to a defect in the wind turbine blade part.

24. The method according to item 23, wherein the method further comprises:
   conveying at least a second image capturing device along the wind turbine blade part; and
   capturing the plurality of acquired images comprises capturing second images of parts of the wind turbine along the wind turbine blade part using the second image capturing device.

25. The method according to any of items 23-24, wherein the first images are thermal or infrared images, and the second images are optical images.

26. The method according to any of items 23-25, wherein the method comprises the step of:
   logging a position of each of the acquired images.

27. The method according to any of items 23-26, wherein the method comprises the step of:
   stitching the plurality of acquired images or the plurality of image processed images to a stitched image mapping a full view of the wind turbine blade part.

28. The method according to any of items 23-27, wherein the method comprises the step of:
   calculating a confidence value for the anomaly for each of a plurality of possible defect types, the confidence value indicating the probability that the anomaly is related to a particular defect type of the plurality of possible defect types.

29. The method according to any of items 28, further comprising:
   assigning the particular defect type with the highest confidence value to the anomaly.

30. The method according to any of items 28-29, wherein the method further comprises:
   in accordance with the confidence values of the two defect types with the highest confidence values of the plurality of possible defect types being within a disambiguation threshold value, initiating a disambiguation process to determine the defect type.

31. The method according to any of items 23-30, wherein the method comprises the step of:
   grouping adjacent pixels that have been identified as belonging to a defect and to the same defect type to a single defect region.

32. The method according to any of items 23-31, wherein the method comprises the step of:
   generating a mask that identifies which pixels of the plurality of acquired images that belong to a defect and preferably to the corresponding defect type.

33. The method according to any of items 23-32, wherein the method comprises the step of:

illuminating one or more areas on the wind turbine blade part to identify defect locations for repair work on the wind turbine blade part.

34. The method according to any of items 23-33, wherein the illumination is carried out by a plurality of light emitting sources.

LIST OF REFERENCE NUMERALS

2 wind turbine
4 tower
6 nacelle
8 hub
10 blade
14 blade tip
16 blade root
18 leading edge
20 trailing edge
22 pitch axis
30 root region
32 transition region
34 airfoil region
36 pressure side shell
38 suction side shell
39 shoulder
40 spar cap
42 sandwich construction
50 mould part
60 wind turbine blade inspection system
62 thermographic image capturing device/infrared camera
64a, 64b optical camera(s)
66 conveying means
70 processing unit/computing unit
72 data instigation module
74 stitching module
76 filter module
78 analytics module
80-84 anomalies
85 non-overlapping image part
88 stitched image of wind turbine blade
90 laser pointers

The invention claimed is:

1. A wind turbine blade inspection system for inspecting a wind turbine blade part for defects during manufacturing, wherein the wind turbine blade shell part extends in a longitudinal direction, and wherein the system comprises:
   a mould for manufacturing the wind turbine blade part;
   a first image capturing device, wherein the first image capturing device is a thermographic image capturing device or an infrared camera;
   a second image capturing device, wherein the second image capturing device is an optical camera;
   conveying means for moving at least the first image capturing device along the mould, with the wind turbine blade part being arranged in the mould, the conveying means being configured to capture a plurality of acquired images comprising first images of parts of the wind turbine blade part along the wind turbine blade part from the first image capturing device and second images of parts of the wind turbine blade part along the wind turbine blade part from the second image capturing device while the wind turbine blade part remains arranged in the mould, wherein the conveying means is arranged on rails along the mould; and an image processing unit configured to identify an anomaly in the plurality of acquired images and identify whether the anomaly relates to a defect in the wind turbine blade part.

2. The system according to claim 1, wherein the at least first image capturing device is configured and positioned to capture images depicting an entire width of the wind turbine blade part.

3. The system according to claim 1, wherein the system further comprises a position logging unit that is configured to log the positions of the plurality of acquired images.

4. The system according to claim 3, wherein the system comprises a stitching module that is configured to stitch the plurality of acquired images or plurality of image processed images to a stitched image mapping a full view of the wind turbine blade part.

5. The system according to claim 1, wherein the system comprises a filter module that is configured to filter our images chosen from the group of: images that are blurred and/or images that do not contain images of the wind turbine blade part and/or images that overlap more than a predefined overlap threshold value.

6. The system according to claim 5, wherein the filter module uses statistical image processing and/or machine learning to identify blurred images.

7. The system according to claim 5, wherein the overlap of images is determined using at least one of: cross correlation of two images, squared difference of two images, or metric learning.

8. The system according to claim 5, wherein the overlap threshold value is between 10% and 50%.

9. The system according to claim 1, wherein the system is configured to identify the anomaly via image annotations.

10. The system according to claim 1, wherein the system comprises an analytics module that is configured to determine whether the anomaly is related to a particular defect type from a plurality of possible defect types.

11. The system according to claim 10, where the analytics module is configured to calculate a confidence value for each of the plurality of possible defect types, the confidence value indicating the probability that the anomaly is related to a particular defect type of the plurality of possible defect types.

12. The system according to claim 10, wherein the analytics module is configured to initiate a disambiguation process, if the confidence values of the two defect types with the highest confidence values of the plurality of possible defect types are within a disambiguation threshold value.

13. The system according to claim 10, wherein the analytics module is configured to receive the plurality of acquired images and output a mask that identifies which pixels of the plurality of acquired images that belong to a defect and preferably to the corresponding defect type, and
   wherein the analytics module is configured to group adjacent pixels that have been identified as belonging to a defect and to the same defect type to a single defect region.

14. The system according to claim 1, wherein the system further comprises a pointer unit, which is configured to illuminate one or more areas on the wind turbine blade part to identify defect locations for repair work on the wind turbine blade part.

15. The system according to claim 14, wherein the pointer unit comprises one, two or more primary laser pointer units distributed along a first side of a mould for manufacturing the wind turbine blade part, and one, two or more secondary laser pointer units distributed along a second side of the mould for manufacturing the wind turbine blade part.

16. A method for inspecting a wind turbine blade part for defects, during manufacturing of the wind turbine blade part, wherein the wind turbine blade part extends in a longitudinal direction, and wherein the method comprises the steps of:

providing a mould for manufacturing the wind turbine blade part with the blade part arranged in the mould;

conveying at least a first image capturing device and a second image capturing device along the mould for manufacturing the wind turbine blade part using conveying means arranged on rails, wherein the first image capturing device is a thermographic image capturing device or an infrared camera, and wherein the second image capturing device is an optical camera;

capturing a plurality of acquired images comprising first images of parts of the wind turbine blade part along the wind turbine blade part using the at least first image capturing device and second images of parts of the wind turbine blade part along the wind turbine blade part from the second image capturing device;

image processing the plurality of acquired images to identify whether any of the plurality of acquired images includes an anomaly; and in accordance with identifying an anomaly, determining whether the anomaly relates to a defect in the wind turbine blade part.

17. The method according to claim 16, wherein the method comprises the step of:

calculating a confidence value for the anomaly for each of a plurality of possible defect types, the confidence value indicating the probability that the anomaly is related to a particular defect type of the plurality of possible defect types, and assigning the particular defect type with the highest confidence value to the anomaly.

18. The method according to claim 17, wherein the method further comprises:

in accordance with the confidence values of the two defect types with the highest confidence values of the plurality of possible defect types being within a disambiguation threshold value, initiating a disambiguation process to determine the defect type.

19. The method according to claim 16, wherein the method comprises the step of:

grouping adjacent pixels that have been identified as belonging to a defect and to the same defect type to a single defect region, and generating a mask that identifies which pixels of the plurality of acquired images that belong to a defect and preferably to the corresponding defect type.

20. The method according to claim 16, wherein the method comprises the step of:

illuminating one or more areas on the wind turbine blade part to identify defect locations for repair work on the wind turbine blade part.

21. A wind turbine blade inspection system for inspecting a wind turbine blade part for defects, wherein the wind turbine blade shell part extends in a longitudinal direction, and wherein the system comprises:

a first image capturing device, wherein the first image capturing device is a thermographic image capturing device or an infrared camera;

a second image capturing device, wherein the second image capturing device is an optical camera;

conveying means for moving at least the first image capturing device along the wind turbine blade part, the conveying means being configured to capture a plurality of acquired images comprising first images of parts of the wind turbine blade part along the wind turbine blade part from the first image capturing device and second images of parts of the wind turbine blade part along the wind turbine blade part from the second image capturing device; and an image processing unit configured to identify an anomaly in the plurality of acquired images and identify whether the anomaly relates to a defect in the wind turbine blade part, wherein the system further comprises a pointer unit configured to illuminate one or more areas on the wind turbine blade part to identify locations for defects identified by the wind turbine blade inspection system for repair work on the wind turbine blade part.

22. A method for inspecting a wind turbine blade part for defects, wherein the wind turbine blade part extends in a longitudinal direction, and wherein the method comprises the steps of:

conveying at least a first image capturing device and a second image capturing device along the wind turbine blade part, wherein the first image capturing device is a thermographic image capturing device or an infrared camera, and wherein the second image capturing device is an optical camera;

capturing a plurality of acquired images comprising first images of parts of the wind turbine blade part along the wind turbine blade part using the at least first image capturing device and second images of parts of the wind turbine blade part along the wind turbine blade part from the second image capturing device;

image processing the plurality of acquired images to identify whether any of the plurality of acquired images includes an anomaly;

when an anomaly is identified, determining whether the anomaly relates to a defect in the wind turbine blade part; and when the anomaly is determined to relate to the defect, illuminating one or more areas on the wind turbine blade part to identify defect locations for repair work on the wind turbine blade part.

* * * * *